(12) United States Patent
Gasparyan et al.

(10) Patent No.: US 10,108,773 B1
(45) Date of Patent: Oct. 23, 2018

(54) PARTITIONING CIRCUIT DESIGNS FOR IMPLEMENTATION WITHIN MULTI-DIE INTEGRATED CIRCUITS

(71) Applicant: Xilinx, Inc., San Jose, CA (US)

(72) Inventors: Grigor S. Gasparyan, San Jose, CA (US); Xiao Dong, San Jose, CA (US); Xiaojian Yang, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 115 days.

(21) Appl. No.: 15/350,957

(22) Filed: Nov. 14, 2016

(51) Int. Cl.
*G06F 17/50* (2006.01)

(52) U.S. Cl.
CPC ...... *G06F 17/5072* (2013.01); *G06F 17/5081* (2013.01)

(58) Field of Classification Search
CPC ............. G06F 17/5072; G06F 2217/84; G06F 17/5031
USPC .......................... 716/105, 108, 113, 123, 124
See application file for complete search history.

(56) References Cited

U.S. PATENT DOCUMENTS

| 5,512,836 | A * | 4/1996 | Chen et al. | G01B 7/023 324/663 |
| 5,532,934 | A * | 7/1996 | Rostoker | G03F 7/70433 257/E23.02 |
| 7,752,588 | B2 * | 7/2010 | Bose | G06F 17/5072 716/122 |
| 8,490,042 | B2 * | 7/2013 | Gao | G06F 17/5072 716/116 |
| 8,774,493 | B2 * | 7/2014 | Yang et al. | G06T 11/00 382/141 |
| 2012/0308152 | A1 * | 12/2012 | Yang et al. | G06T 11/00 382/257 |

* cited by examiner

*Primary Examiner* — Sun Lin
(74) *Attorney, Agent, or Firm* — Kevin T. Cuenot

(57) ABSTRACT

Partitioning a circuit design can include determining, using a processor, a target area utilization and a target cut utilization by iterating over a range of timing violations and determining, using the processor, a worst allowed timing violation based upon the target area utilization and the target cut utilization. Circuit elements of the circuit design can be assigned to partitions, using the processor, for implementation of the circuit design in a multi-die integrated circuit based upon a partition cost calculated using the target area utilization, the target cut utilization, and the worst allowed timing violation.

20 Claims, 6 Drawing Sheets

PARTITIONING CIRCUIT DESIGNS FOR IMPLEMENTATION WITHIN MULTI-DIE INTEGRATED CIRCUITS

FIELD OF THE INVENTION

This disclosure relates to integrated circuits (ICs) and, more particularly, to partitioning circuit designs for implementation within multi-die ICs.

BACKGROUND

A multi-die integrated circuit (IC) is a device created within a single package that includes two or more dies. Each die is a block or portion of semiconductor material that implements a given circuit or function. The dies are integrated so that the dies may be treated as a single IC. The dies may be unified using a variety of known structures. In some cases, for example, the dies are stacked. In other cases, the dies are mounted side-by-side on a substrate such as another die. Despite the particular way the dies are arranged in the package, conductive structures such as wires, vias, and so forth couple the dies thereby allowing the dies to exchange signals with one another. These conductive structures, however, are often limited in number.

In order to implement a circuit design using a multi-die IC, the circuit design must be partitioned. The partitioning process determines which components of the circuit design are allocated to each of the dies of the multi-die IC. The partitioning process must take care not to generate a partitioned circuit design that violates timing or requires more of the inter-die conductive structures than are available.

SUMMARY

One or more embodiments are directed to methods of partitioning a circuit design. In one aspect, a method can include determining, using the processor, a target area utilization and a target cut utilization by iterating over a range of timing violations and determining, using the processor, a worst allowed timing violation based upon the target area utilization and the target cut utilization. The method can include assigning, using the processor, circuit elements of the circuit design to partitions for implementation of the circuit design in a multi-die integrated circuit based upon a partition cost calculated using the target area utilization, the target cut utilization, and the worst allowed timing violation.

One or more embodiments are directed to systems for partitioning a circuit design. In one aspect, a system includes a processor configured to initiate executable operations. The executable operations can include determining a target area utilization and a target cut utilization by iterating over a range of timing violations and determining a worst allowed timing violation based upon the target area utilization and the target cut utilization. The executable operations can include assigning circuit elements of the circuit design to partitions for implementation in a multi-die integrated circuit based upon a partition cost calculated using the target area utilization, the target cut utilization, and the worst allowed timing violation.

One or more embodiments are directed to computer-readable storage media. In one aspect, a computer-readable storage medium has instructions stored thereon which, when executed by a processor, cause the processor to perform a method of partitioning a circuit design. The method can include determining, using the processor, a target area utilization and a target cut utilization by iterating over a range of timing violations and determining, using the processor, a worst allowed timing violation based upon the target area utilization and the target cut utilization. The method can include assigning, using the processor, circuit elements of the circuit design to partitions for implementation of the circuit design in a multi-die integrated circuit based upon a partition cost calculated using the target area utilization, the target cut utilization, and the worst allowed timing violation.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION OF THE DRAWINGS

Figure 1:
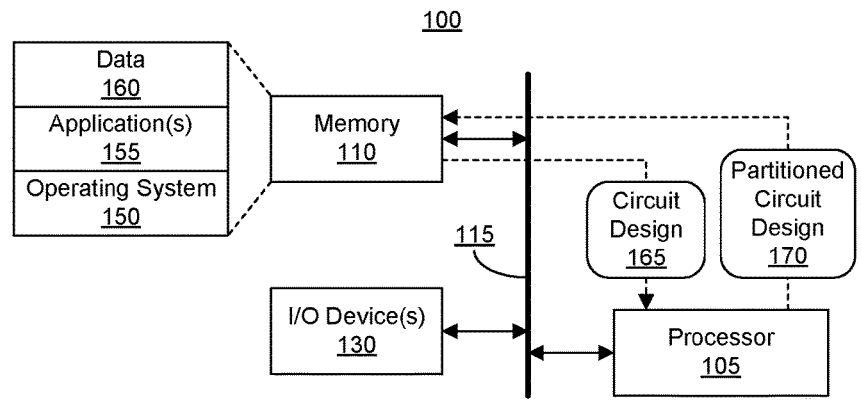
FIG. 1 illustrates an example data processing system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to partitioning circuit designs for implementation within multi-die ICs. A circuit design may be partitioned for implementation within a multi-die IC using a process that is both timing aware and utilization aware. The utilization aware aspect relates to both utilization of conductive structures that couple dies of the multi-die IC and to utilization of area of each die of the multi-die IC. A global partitioning cost or "partition cost" that accounts for cut size, cut timing cost, cut utilization, and area utilization is used to evaluate partitioned circuit designs and select a particular partitioning solution.

In one or more embodiments, targets for cut size and partition area are determined by iterating over a range of possible timing violations. Once targets are established, the targets may be used within the partition cost as constraints. The cost function imposes penalties for violating the targets (or constraints). Further, using the determined targets, a worst allowed timing violation for the circuit design may be determined. For example, the established targets may be held constant while an iterative process is performed to determine the worst allowed timing violation. The system is capable of then partitioning the circuit design using the partition cost given the determined constraints and the worst allowed timing violation.

One or more embodiments described herein are directed to a computer-implemented method for partitioning a circuit design for implementation within a multi-die IC. One or more other embodiments described herein are directed to a system configured to partition a circuit design for implementation within a multi-die IC. The system, for example, may include a processor configured partition the circuit design. One or more other embodiments are directed to a non-transitory computer-readable storage medium storing program code that, when executed, causes a processor and/or a system to perform method(s) for partitioning a circuit design for implementation within a multi-die IC.

Further aspects of the inventive arrangements are described in greater detail below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example data processing system (system) 100. As pictured, system 100 includes at least one processor 105 coupled to a memory 110 through a system bus 115 or other suitable circuitry such as an input/output (I/O) subsystem, an I/O interface, and/or a memory interface. System 100 stores computer readable instructions (also referred to as "program code") within memory 110. Memory 110 may be considered an example of computer readable storage media. Processor 105 executes the program code accessed from memory 110 via system bus 115.

Memory 110 includes one or more physical memory devices such as, for example, a local memory and one or more bulk storage devices. Local memory refers to random access memory (RAM) or other non-persistent memory device(s) generally used during actual execution of the program code. A bulk storage device may be implemented as a hard disk drive (HDD), solid state drive (SSD), or other persistent data storage device. System 100 may also include one or more cache memories (not shown) that provide temporary storage of at least some program code in order to reduce the number of times program code must be retrieved from the bulk storage device during execution.

System 100 may be coupled to one or more I/O devices such as a keyboard, a display device, a pointing device, and/or one or more network adapters. A network adapter enables system 100 to become coupled to other systems, computer systems, remote printers, and/or remote storage devices. Examples of network adapters may include, but are not limited to, modems, cable modems, Ethernet cards, bus adapters, connectors, wireless transceivers and/or radios, and so forth. System 100 may include one or more additional I/O device(s) beyond the examples provided. The I/O devices described herein may be coupled to system 100 either directly or through intervening I/O controllers.

As pictured, memory 110 may store an operating system 150, one or more application(s) 155, and data 160. Application 155, for example, may be an electronic design automation (EDA) application. In one or more embodiments, applications 155 include a partitioning engine or an EDA application that includes a partitioning engine. In one aspect, operating system 150 and application(s) 155, being implemented in the form of executable program code, are executed by system 100 and, more particularly, by processor 105, to perform the various operations described within this disclosure. As such, operating system 150 and application 155 may be considered an integrated part of system 100.

Operating system 150, application 155, and any data (e.g., data 160) used, generated, and/or operated upon by system 100 are functional data structures that impart functionality when employed as part of system 100 or are provided to an IC for implementation therein. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

System 100 may include fewer components than shown or additional components not illustrated in FIG. 1 depending upon the particular type of device that is implemented. In addition, the particular operating system and/or application(s) included may vary according to device type as may the types of network adapter(s) included. Further, one or more of the illustrative components may be incorporated into, or otherwise form a portion of, another component. For example, a processor may include at least some memory.

In the example of FIG. 1, data 160 may include a circuit design 165. Processor 105 is capable of reading circuit design 165 from memory 110 and operating on circuit design 165 by performing partitioning operations. Processor 105, in performing the partitioning operations, generates a partitioned version of circuit design 165 shown as partitioned circuit design 170. Partitioned circuit design 170 is functionally equivalent to circuit design 165 albeit adapted for implementation within a multi-die IC.

Circuit design 170 includes at least two partitions where each partition corresponds to one die of a multi-die IC in which circuit design 170 is to be implemented. Each partition of circuit design 170 effectively specifies the set of components that are placed or assigned to a particular die. As defined herein, the term "partition" refers to a data structure that represents a die of a multi-die IC. Thus, a one-to-one relationship exists between a partition and a die. The term "partition" may also refer to a data structure specifying the set of components of a circuit design that are assigned for implementation within the die represented by the partition. Accordingly, the terms "partition" and "die" may be used interchangeably within this disclosure from time-to-time.

Figure 2:
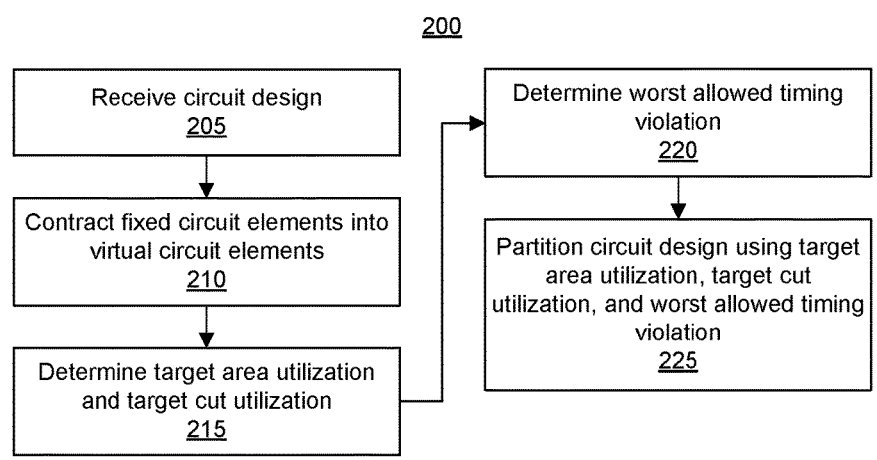
FIG. 2 illustrates an example method of partitioning a circuit design.

FIG. 2 illustrates an example method 200 of partitioning a circuit design. Method 200 illustrates high level operations performed by a system such as the system described in connection with FIG. 1.

In block 205, the system receives the circuit design that is to be partitioned for implementation within the multi-die IC.

In one or more embodiments, the circuit design is specified as a netlist. It should be appreciated that the circuit design may be specified in any of a variety of different digital file, e.g., programmatic, formats. As such, the embodiments described herein are not intended to be limited by the particular examples provided.

In block 210, the system contracts fixed circuit elements of the circuit design into virtual circuit elements. While the circuit design received in block 205 is not initially partitioned, one or more circuit elements of the circuit design may be pre-assigned to a particular die. The pre-assigned circuit elements are referred to as "fixed circuit elements." As an illustrative example, one or more circuit elements such as I/O circuit blocks may be fixed circuit elements since the I/O circuit blocks may be pre-assigned to a particular die or partition of the multi-die IC.

Circuit elements that are pre-assigned to a same die are combined into a same virtual circuit element. The system effectively collapses the set of fixed circuit elements for a given die into a single circuit element called a virtual circuit element within the circuit design to prevent the fixed circuit elements from being assigned to different dies than were pre-assigned. The system does not cut signal paths between fixed circuit elements that are collapsed into a same virtual circuit element.

For example, the system combines the fixed circuit elements of partition 0 into one virtual circuit element for partition 0 that cannot be moved from partition 0. The system combines those fixed circuit elements of partition 1 into a virtual circuit element for partition 1 that cannot be moved from partition 1. Each virtual circuit element is treated as a single non-divisible circuit element of the circuit design for purposes of partitioning. An example of creating virtual circuit elements is illustrated in connection with FIGS. 6 and 7.

In one or more embodiments, contracting fixed circuit elements of the circuit design may be optional, e.g., omitted and not performed. For example, the fixed circuit elements may be pre-assigned to the correct partition and/or removed from consideration.

In block 215, the system determines a target area utilization and a target cut utilization. The system is capable of performing a process, represented by block 215, that determines a target area utilization and a target cut utilization. In general, once target area utilization and target cut utilization are established, the system is able to consider timing, given the established targets.

As defined herein, the term "cut utilization" is a measure of the number of inter-die conductive structures that are needed to implement connections between dies of a multi-die IC for a given partitioning solution of a circuit design given the fixed number of such structures available in the multi-die IC. As defined herein, the term "target cut utilization" is an objective cut utilization or goal that the system attempts to meet in generating one or more partitioning solutions for the circuit design.

For ease of description, the inter-die conductive structures of the multi-die IC used to convey signals between dies are referred to as "super long lines" or "SLLs". The cut utilization and the target cut utilization each may be expressed as a percentage. For example, cut utilization may be expressed as a percentage of the total number of SLLs used for a given partitioning solution for the circuit design with respect to the total number of SSLs available for the target multi-die IC. The target cut utilization, as noted, is an objective goal expressed as a percentage as opposed to a measure for an actual partitioning solution. A partitioning solution that uses 5,000 of 10,000 total available SLLs has a cut utilization of 50%.

As defined herein, the term "area utilization" is a measure of the number of areas of various types on a particular die of the multi-die IC that are needed to accommodate (e.g., place) circuit components of the circuit design compared to the total number of areas available on the die. The term "area" is used herein to refer to a portion of a die that is capable of implementing a circuit element of a circuit design. As defined herein, the term "target area utilization" is an objective area utilization or goal that the system attempts to meet in generating one or more partitioning solutions for the circuit design. The area utilization and the target area utilization each may be expressed as a percentage. Area utilization may be expressed as a percentage of the total number of areas used for a given partitioning solution of a circuit design given the fixed number of areas available in the multi-die IC or a partition of the multi-die IC. Target area utilization, as noted, may be a percentage and is an objective as opposed to a measure for an actual partitioning solution.

In one or more embodiments, area utilization and target area utilization are specified on a per component type basis. For example, each die has a limited number of areas capable of implementing different types of circuit components such as digital signal processing (DSP) circuit blocks, look-up tables (LUTs), block random access memories (BRAMS), look-up table RAM (LUTRAM), and so forth. The area utilization for each different type of circuit block (or component) may be determined and summed to obtain the area utilization for a particular die.

The targets determined in block 215 are often conflicting in nature. For example, in order to achieve a particular cut utilization, area utilization may need to be relaxed or increased. Similarly, in order to achieve a particular area utilization, cut utilization may need to be relaxed or increased. Block 215 may be performed as an iterative process described in greater detail herein with reference to FIG. 3 to determine the targets for each utilization measure that will be incorporated into the partition cost for partitioning as performed in block 225.

In block 220, the system determines a worst allowed timing violation for the circuit design. The system may perform a search for a partitioning solution with a worst allowed timing violation where the target area utilization and the target cut utilization of block 215 are held constant. In one or more embodiments, the system performs a binary search using an initial delay range. Block 220 is described in greater detail herein in connection with FIG. 5.

In block 225, the system performs a final partitioning. In one or more embodiments, the system performs the final partitioning of the circuit design using the determined target area utilization, the target cut utilization, and the worst allowed timing violation. The system determines a partitioning that minimizes the global cost function. For example, the system assigns circuit elements of the circuit design to partitions using the partition cost described herein for implementing the circuit design within a multi-die IC.

An example global cost function that may be used in the various operations of method 200, including block 225, to determine a partitioning solution for the circuit design is shown below as expression 1.

$$\text{PartitionCost} = \text{CutCost} + \text{CutTimingCost} + \text{CutUtilizationCost} + \text{AreaUtilizationCost} \qquad (1)$$

where:

$$CutCost = CutCostCoef * CutSize \quad (2)$$

$$CutTimingCost = WNSCostCoef * WorstTimingViolation + TNSCostCoef \cdot TotalTimingViolation \quad (3)$$

$$CutUtilizationCost = \quad (4)$$
$$(CutSize \leq CutTargetSize)?0 : MaxCutCost^{\frac{CutSize - CutTargetSize}{CutMaxSize - CutTargetSize}}$$

$$AreaUtilizationCost = Part0AreaUtilizationCost + Part1AreaUtilizationCost \quad (5)$$

Referring to expression 5, the area utilization cost (AreaUtilizationCost) is the sum of the area utilization cost of each partition. The quantities in expression 5 are defined in greater detail below.

$$PartAreaUtilizationCost = (PartArea \leq PartTargetArea)?0 : \quad (6)$$
$$MaxAreaCost^{\frac{PartArea - PartTargetArea}{PartCapacity - PartTargetArea}}$$

One or more of the expressions above are dynamic in nature. For example, expression 4 (e.g., CutUtilizationCost) evaluates to zero (0) in certain cases and to a non-zero value in other cases. More particularly, CutUtilizationCost is set to zero when CutSize is less than or equal to CutTargetSize. As such, the importance of CutUtilizationCost within the global expression is minimized while CutSize remains less than or equal to CutTargetSize. Otherwise, the importance of CutUtilizationCost increases within the cost function as CutUtilizationCost is evaluated as $$MaxCutCost^{\frac{CutSize - CutTargetSize}{CutMaxSize - CutTargetSize}}.$$

Within expression 4, CutSize is the number of signals that are cut resulting in a source of the signal being located in one partition and the load(s) of the signal being located in a different partition. Each signal that is cut requires one SLL. The term CutMaxSize is the total number of SLLs available in the multi-die IC. The term CutTargetSize is an objective number of SLLs that may be cut and should not be exceeded for a partitioning solution. If CutTargetSize is exceeded by CutSize, as discussed, a penalty is imposed.

Within this disclosure, CutTargetSize may be used interchangeably with the term "target cut utilization." Target cut utilization is expressed as a percentage and, as such, is not specific to a particular device or family of devices. Target cut utilization may be used for the general case regardless of device type. The quantity CutTargetSize, being an actual number, is specific to a particular target device with a fixed number of SLLs. In the case where a multi-die IC has a fixed number of SLLs, CutTargetSize is equivalent to target cut utilization. Target cut utilization may be calculated as 100*CutTargetSize/CutMaxSize. Thus, the system is capable of using CutTargetSize in place of target cut utilization within the various operations described within this disclosure.

Similarly, expression 6 is dynamic in nature. Expression 6 (e.g., PartAreaUtilizationCost) evaluates to zero (0) for a partition in certain cases and to a non-zero value in other cases. More particularly, PartAreaUtilizationCost is set to zero when PartArea is less than or equal to PartTargetArea. As such, the importance of PartAreaUtilizationCost within the global cost function is minimized while PartArea is less than or equal to PartTargetArea. Otherwise, the importance of PartAreaUtilizationCost increases within the cost function as PartAreaUtilizationCost is evaluated as $$MaxAreaCost^{\frac{PartArea - PartTargetArea}{PartCapacity - PartTargetArea}}.$$

Within expression 6, PartArea is the number of available areas of a partition used to implement circuit elements of the circuit design for a given partitioning. The term PartTargetArea is an objective number of areas of a partition that may be used and should not be exceeded for a partitioning solution. Exceeding PartTargetArea imposes a penalty within the global cost function. The term PartCapacity is the total capacity (e.g., number of areas available) in a partition (or die).

Within this disclosure, PartTargetArea may be used interchangeably with the term "target area utilization." Target area utilization is expressed as a percentage and, as such, is not specific to a particular device or family of devices. Target area utilization may be used for the general case regardless of device type. PartTargetArea, being an actual number, is specific to a particular target device with a fixed number of areas for implementing circuit elements. In the case where a multi-die IC has a fixed number of areas, PartTargetArea is equivalent to target area utilization. Target area utilization may be calculated as 100*PartTargetArea/PartCapacity. Thus, the system is capable of using PartTargetArea in place of target area utilization within the various operations described within this disclosure.

The actual values of CutCostCoef, WNSCostCoef, TNSCostCoef, MaxCutCost, and MaxAreaCost are application-specific constants that may be set or specified through a configuration and/or preferences user interface. In one or more embodiments, the costs described above are normalized to wire-length cost so that the CutCostCoef becomes 1.

In one or more embodiments, the system is able to optimize area utilization cost and cut utilization cost. For each partitioning of a circuit design, the system is capable of defining the target cut utilization and the target area utilization based upon statistical data. By selectively zeroing out CutUtilizationCost and PartAreaUtilizationCost, the importance of each utilization cost may be varied within the global cost function depending upon whether the respective target for the cost is being met.

For instance, if the system determines that cut utilization is less than 30% (e.g., less than 30% of the SLLs are required to implement connections between two dies), then typically the SLLs do not cause any timing or routing issues when the partitioned circuit is later routed for implementation within an IC. The router is capable of routing the partitioned (and placed) circuit design. In this example, the system is capable of lowering the priority of cut minimization for the partitioning within the global cost function by setting CutUtilizationCost to zero.

If, however, the system determines that cut utilization is close or closer to 100%, a router has a high likelihood of failing to complete routing of the circuit design or of generating a routed circuit design with large timing violations. In that case, the system is capable of increasing the priority of cut minimization compared to other elements of the global cost function. In this example, the CutUtilizationCost would be non-zero since CutMaxSize exceeds CutTargetSize.

Similarly, if the system determines that area utilization of both partitions is below approximately 50%, typically routing congestion is not problematic. In that case, the router is capable of determining a routing solution that meets timing. In this example, the system does not prioritize area utilization or not attempt to further optimize area utilization by setting PartAreaUtilizationCost to zero (e.g., PartArea is less than or equal to PartTargetArea). Alternatively, if the system determines that one of the partitions has an area utilization close or closer to 100%, a router is likely to encounter high routing congestion causing router failure or large timing violations. In that case, PartArea exceeds PartTargetArea and the system is capable of increasing the priority of area utilization by using a non-zero value.

Figure 3:
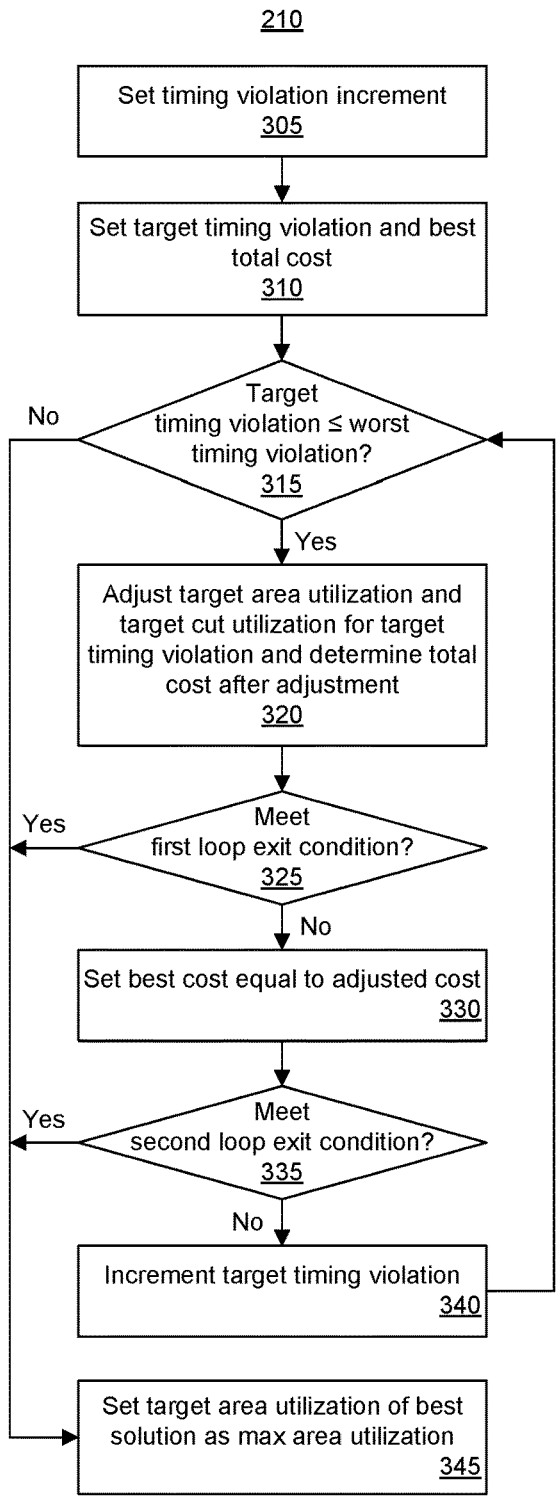
FIG. 3 illustrates an example method of determining target area utilization and target cut utilization.

FIG. 3 is an example method of determining target area utilization and target cut utilization. FIG. 3 illustrates an implementation of block 215 of FIG. 2 in accordance with one or more embodiments described herein. In general, the method of FIG. 3 illustrates a process where each iteration, a different target timing violation is considered. Keeping the target timing violation constant for an iteration of FIG. 3, the system determines a target area utilization and a target cut utilization that may be used in the global cost function.

In block 305, the system sets a timing violation increment value (Vdelta). In one or more embodiments, the system sets Vdelta based upon a number of timing target violation adjustments (num_adjust_iters) and a worst timing violation (Vworst). The number of timing target violation adjustments controls the number of iterations of the process illustrated in FIG. 3 that are to be performed. The number of timing target violation adjustments is a system preference that may be adjusted by a user to influence runtime. For example, the system may set Vdelta equal to the expression Vworst/num_adjust_iters. The value of Vworst, at least initially, may be a constant. It should be appreciated that at this point in the process, timing is being determined by disallowing the cutting of critical connections that would result in a timing violation higher than Vtarg. In this regard, when considering whether a timing violation is higher than Vtarg, the system is considering the timing violation that would occur if that connection is cut, which would result in at least a minimum delay increase as the connection would then traverse from one die to another. In this regard, the timing violations of connections are considered after (and if) the connection is cut.

In block 310, the system sets the target timing violation (Vtarg) and the best total cost (best_cost). In one or more embodiments, the target timing violation is set or initialized to zero in block 310. The best total cost is set or initialized to infinity.

In block 315, the system determines whether the target timing violation (Vtarg) is less than or equal to the worst timing violation (Vworst). If so, the method continues to block 320. If not, the method may exit the loop and continue to block 345.

In block 320, the system adjusts the target area utilization and the target cut utilization given the current value of the target timing violation (Vtarg). Further, the system determines the total cost using expression 1 after adjustment, e.g., using the current target timing violation, the target area utilization, and the target cut utilization. The total cost after adjustment may be referred to as the adjusted cost (adjust_cost). Block 320 may be implemented as an iterative process, an embodiment of which is described in greater detail in connection with FIG. 4.

In block 325, the system determines whether a first loop exit condition is met. In one or more embodiments, the first loop exit condition is whether the total cost after adjustment (adjust_cost) is greater than or equal to the best cost (best_cost). As noted, the best cost is initially set to infinity. If the total cost after adjustment is greater than or equal to the best cost, the system exits the loop and continues to block 345. In that case, the system presumes that further processing for determining the target cut utilization and the target area utilization given the current target timing violation is likely to worsen. If the total cost after adjustment is not greater than or equal to the best cost, the system continues to block 330.

In block 330, the system sets the best cost (best_cost) equal to the total adjusted cost (adjust_cost). In block 335, the system determines whether a second loop exit condition is met. In one or more embodiments, the second loop exit condition is whether the total utilization cost is equal to zero. If the total utilization cost is zero, the system exits the loop and continues to block 345. If the total utilization cost is not zero, the system continues to block 340.

In one or more embodiments, the total utilization cost may be determined as the sum of CutUtilizationCost and AreaUtilizationCost. As discussed, AreaUtilizationCost may be determined on a per area type basis. The total utilization cost has a value of zero when PartArea is less than or equal to PartTargetArea for each partition resulting in AreaUtilizationCost being zero; and also when CutSize is less than or equal to CutTargetSize resulting in CutUtilizationCost being zero.

In block 340, the system increments the target timing violation (Vtarg). In one or more embodiments, the system increments the target timing violation by the timing violation increment (Vdelta). After block 340, the system loops back to block 315 to continue processing.

The method of FIG. 3 may continue to iterate over the range of target timing violations where target area utilizations and target cut utilizations are determined for each target timing violation over the range. For each case, the system determines the total cost after adjustment.

In block 345, in the case where the loop is broken or exited, the system selects the target area utilization of the best solution achieved to the partitioning problem. The best solution is the lowest cost solution determined over the range of target timing violations using the global cost metric. The selected target area utilization is later used within the global cost function when performing the final partitioning in block 225.

Figure 4:
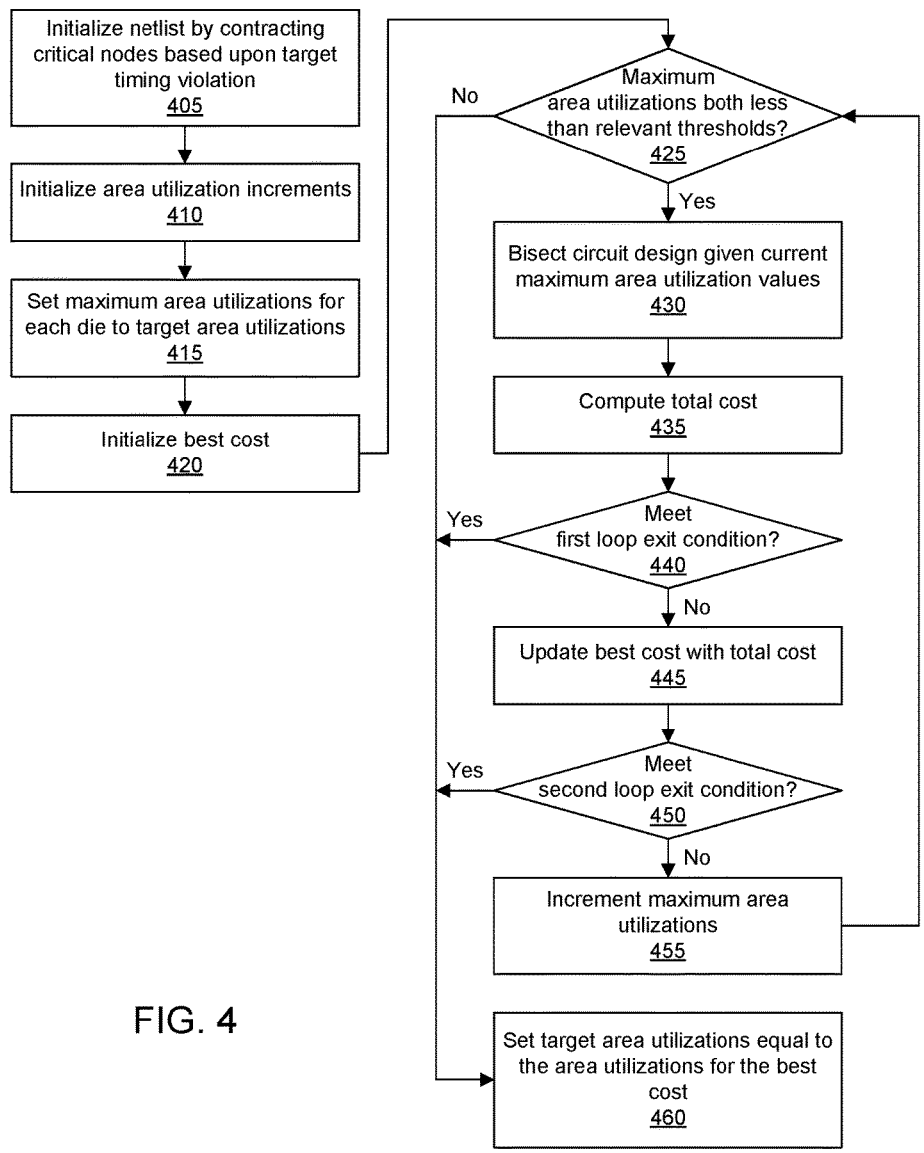
FIG. 4 illustrates an example method of determining target area utilization and target cut utilization for a specified target timing violation.

FIG. 4 is an example method of determining target area utilization and target cut utilization for a specified target timing violation. FIG. 4 illustrates an implementation of block 320 of FIG. 3 in accordance with one or more embodiments described herein. As such, FIG. 4 is implemented or called each time that block 320 is performed for a different target timing violation over the range of target timing violations as described in connection with FIG. 3.

Figure 7:
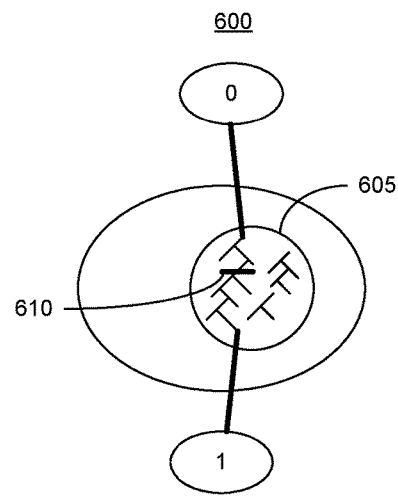
Figure 8:
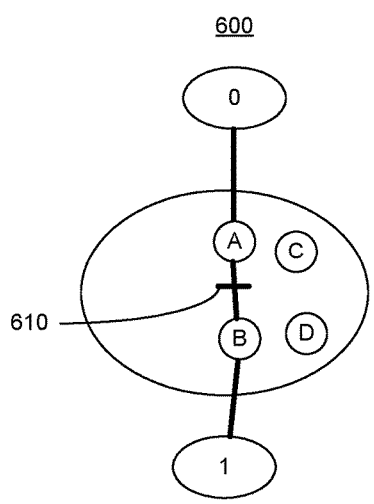

In block 405, the system initializes the circuit design by contracting circuit elements based upon the target timing violation. For the current target timing violation (Vtarg), those circuit elements that have a target timing violation that exceeds the target timing violation are contracted into a single circuit element. In one or more embodiments, the circuit design is expressed as a netlist. The system is capable of identifying those circuit elements of the netlist connected by a signal with timing that is worse than the target timing violation. Those circuit elements are contracted into a single circuit element. The netlist is effectively re-written with circuit element contracted based upon the current target timing violation. An example of circuit element contraction is illustrated in FIGS. 7 and 8.

As the method of FIG. 4 is performed iteratively, for each target timing violation, the system detects the timing edges (e.g., signals) with a timing violation greater than the target timing violation. The system locates the connected circuit elements defined by each signal and, for each signal with a timing violation, contracts the circuit elements connected by the signal into a single circuit element. As multi-die partitioning is performed early in the placement process when utilization constraints are not yet considered, connections of a same critical path of the circuit design typically have similar timing budgets. By contracting timing edges having certain timing criticality, signal paths of the circuit design with a selected timing criticality are placed in a single circuit element thereby preventing the signal paths from being cut. In many cases, the timing critical paths combined into a single circuit element referred to as a contracted circuit element often represent a timing critical hierarchical module that should be placed within a same (e.g., a single) die.

Contraction, or combining circuit elements, allows the system to treat the contracted circuit element as a single circuit element that is not divisible. The system does not cut signal paths between the circuit elements in the contracted circuit element. To cut such signal paths would result in placing the circuit elements in different partitions and further exacerbate timing since signals between the circuit elements would then be required to traverse from one die to another. By treating the contracted circuit elements as a single circuit element, the contracted circuit elements remain together in a single partition. This allows the placer, when operating on the partition level, to find a placement that may meet timing.

In block 410, the system initializes the area utilization increments. The area utilization increments may be specified on a per partition basis. For purposes of illustration, the area utilization increment of partition 0 is referred to as Udelta0. The area utilization increment of partition 1 is referred to as Udelta1.

In block 415, the system sets the maximum area utilizations for each die to the target area utilizations. The maximum area utilization of partition 0 is referred to as Umax_current0. The maximum area utilization of partition 1 is referred to as Umax_current1. In block 420, the system initializes the best cost (best_cost) to infinity.

In block 425, the system determines whether the maximum area utilization of each partition is less than the relevant threshold for the partition. When the maximum area utilization of each partition is less than the threshold for that partition, the method may continue to block 430. When the maximum area utilization of one or both partitions is not less than the relevant threshold(s) for the relevant partition(s), the method can proceed to block 460. The threshold for partition 0 is referred to as Umax0. The threshold for partition 1 is referred to as Umax1. The values of Umax0 and Umax1 may be specified as system preferences. For example, Umax0 and/or Umax1 may be specified as a percentage of the available areas for each partition (die) of the multi-die IC. In one or more embodiments, each of Umax0 and Umax1 is set to 100%.

In block 430, the system bisects the circuit design given the current maximum area utilization values. The system determines a bisection of the circuit design while respecting the contracted circuit elements and observing the maximum area utilization values. In block 435, the system determines the total cost of the partitioning determined in block 430. The system may calculate the total cost using the global cost function of expression 1.

In bock 440, the system determines whether a first loop exit condition is met. In one or more embodiments, the system determines whether the total cost is greater than or equal to the best cost. When the total cost determined in block 435 is greater than or equal to the best cost, the method exits the loop and proceeds to block 460. When the total cost determined in block 435 is less than the best cost, the method continues to block 445. In block 445, the system updates the best cost by setting the best cost equal to the total cost from block 435.

In block 450, the system determines whether a second loop exit condition is met. The system determines whether both the target area utilization and the target cut utilization constraints are met. When both the target area utilization and the target cut utilization constraints are met, the method exits the loop and proceeds to block 460. When both the target area utilization and the target cut utilization constraints are not met, the method continues to block 455.

In block 455, the system increments both of the maximum area utilizations. For example, the system increments Umax_current0 by Udelta0 and increments Umax_current1 by Udelta1. After block 455, the method loops back to block 425 to continue processing.

In block 460, where either a loop exit condition is met or one or both of the maximum area utilizations exceeds the relevant threshold for that partition, the system sets the target area utilization(s) (e.g., for each partition) equal to the area utilizations for the bisection determined in block 430 that has the best (e.g., lowest) cost.

FIG. 4 illustrates an example where, for a given target timing violation, the system iterates over different area utilizations in a range of possible area utilizations for the partitions to determine costs of different partitioning solutions. The example of FIG. 4 begins with a strict area utilization and relaxes the area utilization for each iteration while holding the target timing violation constant. As the method of FIG. 4 continues to iterate and the area utilization is further relaxed, the cut utilization will improve. FIG. 4 continues to iterate until the area utilizations leave the range to be explored or an inflexion point is reached where the best cost starts to worsen rather than improve thereby determining both the target area utilization and the target cut utilization.

Figure 5:
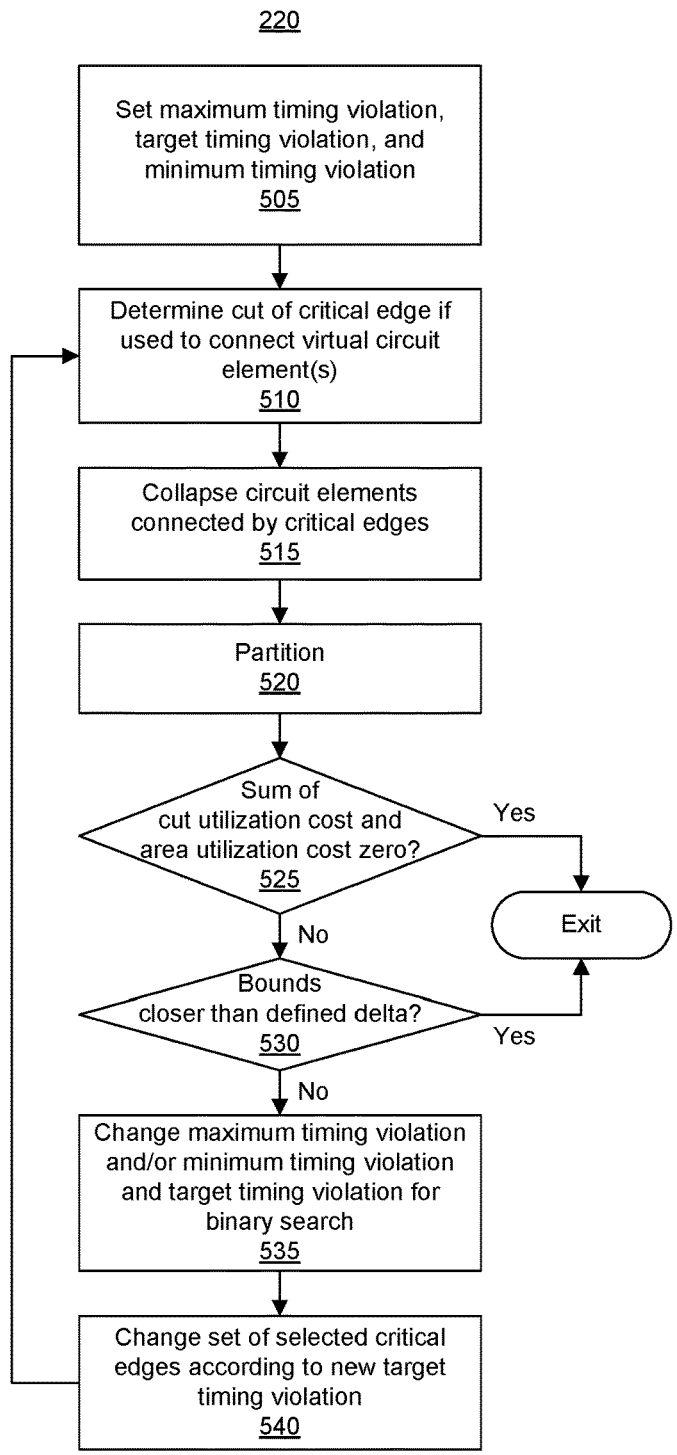
FIG. 5 illustrates an example method of determining a worst allowed timing violation for the circuit design.

FIG. 5 is an example method of determining a worst allowed timing violation (Vworst) for the circuit design. FIG. 5 illustrates an implementation of block 220 of FIG. 2 in accordance with one or more embodiments described herein.

FIG. 5 illustrates an example where a worst allowed timing violation for the circuit design is determined using the area utilization and the cut utilization as determined and described in connection with FIGS. 3 and 4. Whereas Vworst as described earlier in connection with block 315 was a fixed upper range, the value of Vworst determined in FIG. 5 is the value to be used in determining the final partitioning solution in block 225 of FIG. 2. FIG. 5 illustrates an example of a binary search conducted within an established range of timing violations.

In block 505, the system sets the maximum timing violation and the minimum timing violation for the range of timing violations to be explored. Further, the system sets the target timing violation (Vtarg) to the midpoint timing violation of the specified range. For purposes of illustration, the minimum timing violation may be set to 0; the maximum timing violation may be set to −1,000 picoseconds (representing a maximum allowed timing violation); and the target timing violation may be set to −500 picoseconds.

In block 510, the system determines a cut of a critical signal if used to connect virtual circuit elements. Virtual circuit elements are described in connection with block 205 of FIG. 2. As previously described, a virtual circuit element represents one or more fixed circuit elements as a single circuit element in the circuit design.

As an illustrative example, consider the case where a path with critical signals exists from virtual circuit element 0 (representing partition 0) to virtual circuit element 1 (representing partition 1). Contracting critical signals in that case results in contracting the two virtual circuit elements. Since each virtual circuit element includes fixed circuit elements, contracting the two virtual circuit elements into a single partition places fixed circuit elements of different partitions into the same, single partition. This violates the fixed nature of the circuit elements. Accordingly, the system is capable of removing one or more signals from the set of critical signals to ensure that no signal path connects the virtual circuit elements.

In one or more embodiments, the system is capable of using a minimum cost maximum flow technique for removing the signals from the set of critical signals. By using the minimum cost maximum flow technique, the system is capable of operating on signals of larger criticality while ignoring signals of lesser criticality. For example, for a path of circuit elements A, B, and C, where A to B has a criticality of 100 picoseconds and B to C has a criticality of 200 picoseconds, the system ignores the portion from A to B and contracts the B to C portion into a single circuit element. The signal path with the higher criticality level is contracted thereby allowing the portion of lesser criticality to be cut.

In block 515, the system contracts circuit elements connected by the critical signals identified in block 510 into a contracted circuit element, e.g., a single circuit element. For example, the system determines each signal of the circuit design having a timing worse than the target timing violation (Vtarg). The system collapses the components connected by the critical signal into a single circuit element.

In block 520, the system partitions the circuit design. The system partitions the circuit design using the established area utilization, cut utilization, and current value of Vtarg.

In block 525, the system determines whether a sum of the cut utilization cost and the area utilization cost is zero. If so, the method exits. If the sum is not zero, the method continues to block 530.

In block 530, the system determines whether the maximum timing violation and the minimum timing violation are within a defined delta. The delta may be used to discontinue searching in cases where the difference between the maximum timing violation and the minimum timing violation is less than the delta. If the difference between the maximum timing violation and the minimum timing violation is less than the delta, the method exits. If the difference between the maximum timing violation and the minimum timing violation is not less than the delta, the method proceeds to block 535.

Continuing with the prior example of 0 and −1,000 picoseconds for purposes of illustration, the worst case scenario is to perform 10 partitions (e.g., log(1000)). After 5 partitions (iterations), the range between the minimum timing violation and the maximum timing violation is less than approximately 70 picoseconds. This degree of uncertainty may be an acceptable tradeoff for improvement (e.g., reduction) in runtime. Further, this level of timing violation may be overcome through placement and routing of the partitions subsequent to the partitioning process. For example, the ranges used in each of the five iterations may be as follows: 0 to −1,000; then 0 to −500; then 0 to −250; then 0 to −125; then 0 to −62.5.

In block 535, the system changes or updates the target timing violation, the minimum timing violation, and/or the maximum timing violation. For example, if the initial range is 0 to −1,000 picoseconds and the target timing is met by the partitioning solution using the defined targets, the system maintains the minimum timing violation at 0 picoseconds and halves the maximum timing violation to −500 picoseconds. The target timing violation becomes the average of the minimum and maximum timing violation which is −250 picoseconds in this case. If the target timing violation is not met by the partitioning solution, the system increases the minimum timing violation to one half the value of the maximum timing violation. In this example, the minimum timing violation is updated to −500 picoseconds, while the maximum timing violation is maintained at −1,000 picoseconds. The target timing violation is updated to −750 picoseconds, which is the average of the minimum and maximum timing violations.

In block 540, the system changes the set of selected critical edges according to the new target timing violation set in block 535. After block 540, the method loops back to block 510 to continue checking for partitioning solutions that meet the target timing violation.

Figure 6:
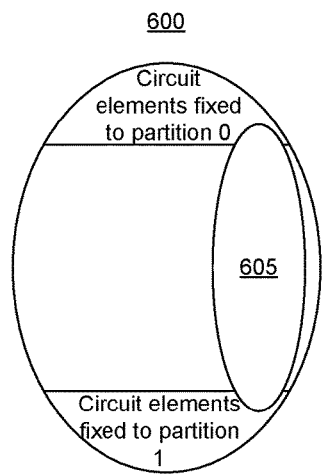
FIGS. 6-9, taken collectively, illustrate partitioning operations for a circuit design.

FIGS. 6-10 illustrate example partitioning operations for a circuit design 600. FIG. 6 illustrates circuit design 600 having one or more circuit elements (e.g., nodes) that are fixed to partition 0 shown at the top portion. Circuit design 600 includes one or more circuit elements that are fixed to partition 1 shown at the bottom portion. Circuit design 600 further includes a set of critical signals and circuit elements 605.

FIG. 7 illustrates circuit design 600 where the circuit elements fixed to partition 0 are combined into a single, virtual circuit elements corresponding to partition 0. Similarly, the circuit elements fixed to partition 1 are combined to a single, virtual circuit elements corresponding to partition 1. Collapsing those circuit elements of the circuit design that are fixed to a particular partition prevents the circuit elements from being assigned to a different partition that violates the fixed nature of the circuit elements. FIG. 7 also illustrates a minimum cut 610 between the fixed circuit elements within the critical signals and circuit components 605.

FIG. 8 illustrates an example where the set of critical signals and circuit components 605 are combined into critical circuit elements (e.g., contracted circuit elements). The set of critical signals and circuit components 605 are collapsed into circuit elements A, B, C, and D. The signals and circuit elements collapsed into circuit elements A, B, C, and D, for example, represent one or more circuit components connected by signals with a timing violation that exceeds a target timing violation during a given processing iteration. Collapsing the signals and circuit elements into a single circuit element as shown, e.g., multiple circuit elements into a given circuit element A, prevents the system from making a cut within the contracted circuit elements and exacerbating the timing violation. Cut 610 of FIG. 7 is also shown in FIG. 8 between critical circuit elements A and B.

Figure 9:
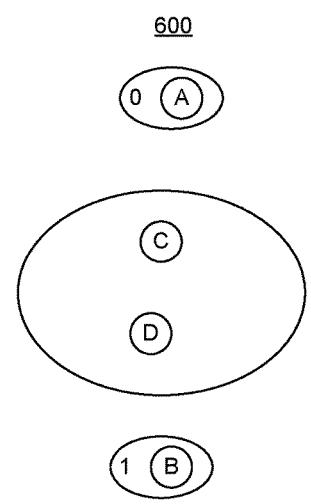

FIG. 9 illustrates an example where critical circuit element A is allocated to partition 0 and circuit element B is allocated to partition 1. The circuit element, being separated by a cut, are allocated to different partitions. Circuit elements C and D are not yet partitioned.

Figure 10:
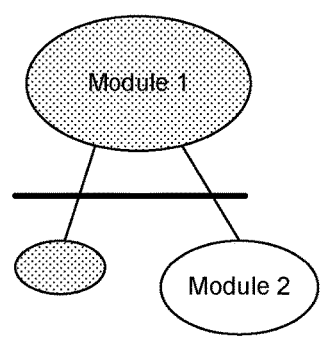
FIG. 10 illustrates an example partitioning of a circuit design.

FIG. 10 is an example of a balanced partitioning of a circuit design that may be achieved using the inventive arrangements described within this disclosure.

Figure 11:
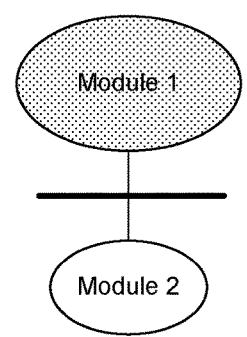
FIG. 11 illustrates another example partitioning of a circuit design.

FIG. 11 is another example of a partitioning of a circuit design with a low cut cost. As illustrated, the example of FIG. 11 does not have a balanced area utilization as does the example partitioning of FIG. 10.

With the circuit design partitioned as described herein, each partition may under placement and/or routing. The circuit design may be converted into a configuration bitstream that may be loaded into a multi-die IC thereby implementing the circuit design therein.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system. As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. As defined herein, the term "output" means storing in physical memory elements, e.g., devices, writing to display or other peripheral output device, sending or transmitting to another system, exporting, or the like. As defined herein, the term "plurality" means two or more than two.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in one or more other embodiments," and similar language throughout this disclosure may, but do not necessarily, all refer to the same embodiment.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, a graphics processing unit (GPU), a controller, and so forth.

As defined herein, the term "user" means a human being. The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." As defined herein, a computer readable storage medium is non-transitory.

Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

One or more embodiments are directed to a method of partitioning a circuit design. The method can include determining, using the processor, a target area utilization and a target cut utilization by iterating over a range of timing violations and determining, using the processor, a worst allowed timing violation based upon the target area utilization and the target cut utilization. The method can include assigning, using the processor, circuit elements of the circuit design to partitions for implementation of the circuit design in a multi-die integrated circuit based upon a partition cost calculated using the target area utilization, the target cut utilization, and the worst allowed timing violation.

Determining a target area utilization and a target cut utilization can include, for different timing violations in the range of timing violations, bisecting the circuit design for a selected maximum area utilization.

In one aspect, the bisecting is performed for each of a plurality of different maximum area utilizations for each of the different timing violations.

In another aspect, for each of the different timing violations, circuit elements connected by timing critical signals of the circuit design are first collapsed.

Determining a worst allowed timing violation can include performing a binary search for the worst allowed timing violation by holding the target area utilization and the target cut utilization constant.

In another aspect, circuit elements connected by timing critical signals are collapsed together.

In another aspect, partition cost is a sum of cut cost, cut timing cost, cut utilization cost, and area utilization cost.

In another aspect, the cut utilization cost is set equal to zero when a cut size does not exceed a cut target size.

In another aspect, the area utilization cost of a partition is zero when the partition area does not exceed the partition target area.

The method can also include combining fixed circuit elements of the circuit design into virtual circuit elements.

One or more embodiments are directed to a system for partitioning a circuit design. The system can include a processor configured to initiate executable operations. The executable operations can include determining a target area utilization and a target cut utilization by iterating over a range of timing violations and determining a worst allowed timing violation based upon the target area utilization and the target cut utilization. The executable operations can include assigning circuit elements of the circuit design to partitions for implementation in a multi-die integrated circuit based upon a partition cost calculated using the target area utilization, the target cut utilization, and the worst allowed timing violation.

Determining a target area utilization and a target cut utilization can include, for different timing violations in the range of timing violations, bisecting the circuit design for a selected maximum area utilization.

In one aspect, bisecting is performed for each of a plurality of different maximum area utilizations for each of the different timing violations.

In another aspect, for each of the different timing violations, circuit elements connected by timing critical signals of the circuit design are first collapsed.

Determining a worst allowed timing violation can include performing a binary search for the worst allowed timing violation by holding the target area utilization and the target cut utilization constant.

In another aspect, circuit elements connected by timing critical signals are collapsed together.

In another aspect, the partition cost is a sum of cut cost, cut timing cost, cut utilization cost, and area utilization cost.

In another aspect, the cut utilization cost is set equal to zero when a cut size does not exceed a cut target size.

In another aspect, the area utilization cost of a partition is zero when the partition area does not exceed the partition target area.

The processor can also be configured to initiate executable operations including combining fixed circuit elements of the circuit design into virtual circuit elements.

One or more embodiments are directed to a computer-readable storage medium having instructions stored thereon which, when executed by a processor, cause the processor to perform a method of partitioning a circuit design. The method can include determining, using the processor, a target area utilization and a target cut utilization by iterating over a range of timing violations and determining, using the processor, a worst allowed timing violation based upon the target area utilization and the target cut utilization. The method can include assigning, using the processor, circuit elements of the circuit design to partitions for implementation of the circuit design in a multi-die integrated circuit based upon a partition cost calculated using the target area utilization, the target cut utilization, and the worst allowed timing violation.

Determining a target area utilization and a target cut utilization can include, for different timing violations in the range of timing violations, bisecting the circuit design for a selected maximum area utilization.

In one aspect, the bisecting is performed for each of a plurality of different maximum area utilizations for each of the different timing violations.

In another aspect, for each of the different timing violations, circuit elements connected by timing critical signals of the circuit design are first collapsed.

Determining a worst allowed timing violation can include performing a binary search for the worst allowed timing violation by holding the target area utilization and the target cut utilization constant.

In another aspect, circuit elements connected by timing critical signals are collapsed together.

In another aspect, partition cost is a sum of cut cost, cut timing cost, cut utilization cost, and area utilization cost.

In another aspect, the cut utilization cost is set equal to zero when a cut size does not exceed a cut target size.

In another aspect, the area utilization cost of a partition is zero when the partition area does not exceed the partition target area.

The method can also include combining fixed circuit elements of the circuit design into virtual circuit elements.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of partitioning a circuit design, the method comprising:
    determining, using a processor, a target area utilization and a target cut utilization by iterating over a range of timing violations;
    determining, using the processor, a worst allowed timing violation based upon the target area utilization and the target cut utilization; and
    assigning, using the processor, circuit elements of the circuit design to partitions for implementation of the circuit design in a multi-die integrated circuit based upon a partition cost calculated using the target area utilization, the target cut utilization, and the worst allowed timing violation.

2. The method of claim 1, wherein the determining a target area utilization and a target cut utilization comprises, for different timing violations in the range of timing violations, bisecting the circuit design for a selected maximum area utilization.

3. The method of claim 2, wherein the bisecting is performed for each maximum area utilization of a plurality of different maximum area utilizations for each timing violation of the different timing violations.

4. The method of claim 2, wherein, for each timing violation of the different timing violations, circuit elements connected by timing critical signals of the circuit design are first collapsed.

5. The method of claim 1, wherein the determining a worst allowed timing violation comprises performing a binary search for the worst allowed timing violation by holding the target area utilization and the target cut utilization constant.

6. The method of claim 5, wherein circuit elements connected by timing critical signals of the circuit design are collapsed together.

7. The method of claim 1, wherein the partition cost is a sum of a cut cost, a cut timing cost, a cut utilization cost, and an area utilization cost.

8. The method of claim 7, wherein:
    the cut utilization cost is set equal to zero when a cut size does not exceed a cut target size; and
    the area utilization cost of a partition is zero when a partition area does not exceed a partition target area.

9. The method of claim 1, further comprising:
combining fixed circuit elements of the circuit design into virtual circuit elements.

10. A system for partitioning a circuit design, the system comprising:
a processor configured to initiate executable operations including:
determining a target area utilization and a target cut utilization by iterating over a range of timing violations;
determining a worst allowed timing violation based upon the target area utilization and the target cut utilization; and
assigning circuit elements of the circuit design to partitions for implementation in a multi-die integrated circuit based upon a partition cost calculated using the target area utilization, the target cut utilization, and the worst allowed timing violation.

11. The system of claim 10, wherein the determining a target area utilization and a target cut utilization comprises, for different timing violations in the range of timing violations, bisecting the circuit design for a selected maximum area utilization.

12. The system of claim 11, wherein the bisecting is performed for each maximum area utilization of a plurality of different maximum area utilizations for each timing violation of the different timing violations.

13. The system of claim 11, wherein, for each timing violation of the different timing violations, circuit elements connected by timing critical signals of the circuit design are first collapsed.

14. The system of claim 10, wherein the determining a worst allowed timing violation comprises performing a binary search for the worst allowed timing violation by holding the target area utilization and the target cut utilization constant.

15. The system of claim 14, wherein circuit elements connected by timing critical signals of the circuit design are collapsed together.

16. The system of claim 10, wherein the partition cost is a sum of a cut cost, a cut timing cost, cut a utilization cost, and an area utilization cost.

17. The system of claim 16, wherein:
the cut utilization cost is set equal to zero when a cut size does not exceed a cut target size; and
the area utilization cost of a partition is zero when a partition area does not exceed a partition target area.

18. The system of claim 16, wherein the processor configured to initiate executable operations further including:
combining fixed circuit elements of the circuit design into virtual circuit elements.

19. A computer-readable storage medium having instructions stored thereon which, when executed by a processor, cause the processor to perform a method of partitioning a circuit design, the method comprising:
determining, using the processor, a target area utilization and a target cut utilization by iterating over a range of timing violations;
determining, using the processor, a worst allowed timing violation based upon the target area utilization and the target cut utilization; and
assigning, using the processor, circuit elements of the circuit design to partitions for implementation of the circuit design in a multi-die integrated circuit based upon a partition cost calculated using the target area utilization, the target cut utilization, and the worst allowed timing violation.

20. The computer-readable storage medium of claim 19, wherein the determining a target area utilization and a target cut utilization comprises, for different timing violations in the range of timing violations, bisecting the circuit design for a selected maximum area utilization.

\* \* \* \* \*